Figure 1:
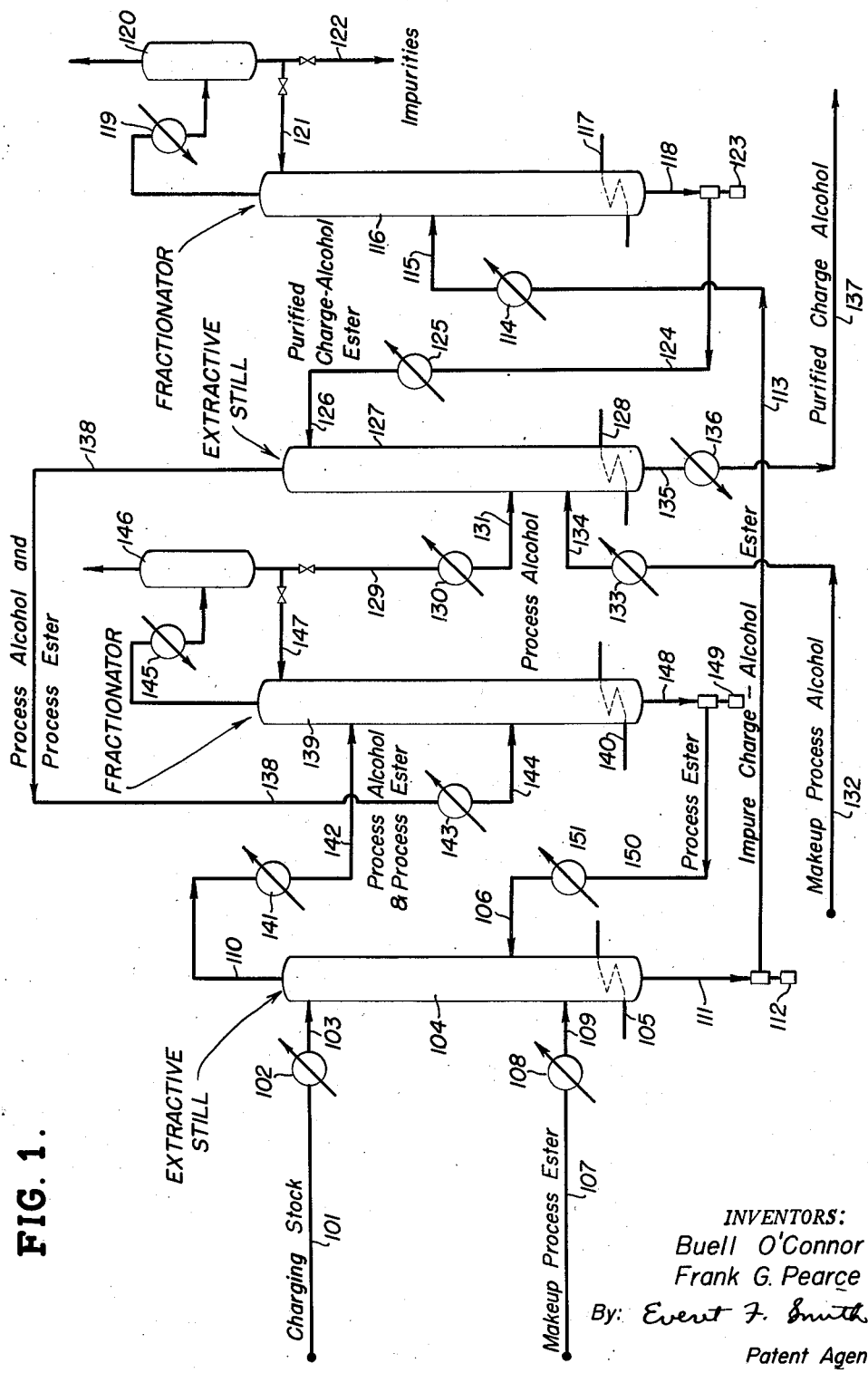

INVENTORS:
Buell O'Connor
Frank G. Pearce
By: Everet F. Smith
Patent Agent

Patented Mar. 4, 1952

2,587,753

UNITED STATES PATENT OFFICE 2,587,753

METHOD FOR PURIFYING ALCOHOLS

Buell O'Connor and Frank G. Pearce, Tulsa, Okla., assignors to Stanolind Oil and Gas Company, Tulsa, Okla., a corporation of Delaware Application April 26, 1949, Serial No. 89,636

5 Claims. (Cl. 260—643)

This invention relates to the purification of alcohols. More particularly, it relates to the separation of alcohols from admixture with other organic compounds by the preparation, segregation, and decomposition of borate esters.

In the introduction of alcohols by various processes, the desired products are obtained in varying states of purity. Methanol, for example, is commonly obtained in a high degree of purity by the reaction of hydrogen and carbon monoxide over certain catalysts, and ethanol is obtained in a readily purifiable form by the yeast-fermentation of various carbohydrates. Other processes, however, do not in general produce single products or products from which the individual constituents may readily be separated. For example, in the oxidation of normally liquid hydrocarbons according to various processes well known in the art, products are obtained which consist of a wide variety of the original hydrocarbons and the oxygen-containing compounds derivable therefrom. As a further example, in the hydrogenation of carbon monoxide according to the Fischer-Tropsch process and its numerous modifications, particularly in embodiments thereof employing alkali-promoted iron catalysts, a two-phase product is obtained comprising water and virtually the entire range of saturated and unsaturated aliphatic hydrocarbons, primary aliphatic alcohols, aliphatic ketones, and aliphatic carboxylic acids. When the separation of such mixtures is attempted by fractional distillation, each fraction ordinarily comprises a complex mixture of hydrocarbons and organic oxygenated componuds, and further segregation of the components thereof is ordinarily not feasible by conventional distillation methods.

It has heretofore been proposed to separate alcohols from admixture with other organic compounds by a boration process, in which a mixture of alcohols with non-esterifiable substances, such as hydrocarbons, ethers, heterocyclics, and the like, is treated with boric acid or boric anhydride under esterification conditions to produce the relatively high-boiling alcohol borates, from which the non-alcoholic impurities may readily be distilled. The borates may thereafter be hydrolyzed by conventional means to release the alcohols in relatively pure form. The basic boration process, however, when carried out in this way, is open to the objection that the boration procedure is relatively slow and expensive, and the recovery and recycling of the boric acid is complicated by the fact that it is released from the alcohol esters in the form of a dilute aqueous solution, or as a slurry in a saturated aqueous solution.

We have now discovered that the boration of an alcohol can be effected by treating it with a borate ester of another alcohol under radical-exchange conditions, and under conditions, to be set forth more fully hereinafter, such that the new borate ester produced thereby can be separated from the other constituents of the reaction mixture. The new borate ester is thereafter decomposed, and the original alcohol is liberated and recovered in purified form.

We have further discovered that the original alcohol can be liberated from the borate ester thereof and the borate ester of said other alcohol can be simultaneously regenerated and recovered by a novel operation in which the borate ester of the original alcohol is countercurrently contacted with said other alcohol under radical-exchange conditions and under conditions of temperature and pressure such that either said new borate ester or said other alcohol, whichever is lower boiling, is maintained in the vapor phase.

(For convenience, the original alcohol that is to be treated according to our invention will hereinafter be termed the "charge alcohol"; after purification it will be the "purified charge alcohol"; the ester employed in the esterification of the charge alcohol will be the "process ester"; the alcohol derivable from the process ester will be the "process alcohol"; and the esterified charge alcohol will be the "charge-alcohol ester.")

On the basis of these discoveries, we have devised a novel and highly advantageous process for the purification of alcohols, including the steps of esterifying an alcohol (the "charge alcohol") with a borate ester (the "process ester") of another alcohol (the "process alcohol"), separating the resulting charge-alcohol ester, countercurrently contacting the charge-alcohol ester with the process alcohol, whereby the charge alcohol and the process ester are regenerated, and recycling the process ester.

One object of our invention is to purify alcohols. Another object is to separate alcohols from other organic materials. A further object is to separate alcohols from hydrocarbons, ethers, aldehydes, ketones, heterocyclic compounds, and the like, boiling at or near the boiling points of said alcohols. A still further object of our invention is to facilitate the conversion of alcohols into borate esters and the recovery of borate values from the resulting esters. Another object is to adapt the boration process for purifying alcohols to continuous operation. Other objects of our invention and its advantages over the prior art will be apparent from the following description and claims.

In the esterification step of our invention, the impure alcohol charging stock is heated with a process ester, said ester being a borate of another alcohol (the "process alcohol") which has a boiling point sufficiently different from the boiling point of the charge alcohol to permit the two alcohols to be separated by fractional distillation. Ordinarily a difference in boiling points of 5 to 10° C. is sufficient for this purpose. We prefer to use a process ester derived from an alcohol boiling 5 to 10° C. or more below the boiling point of the charge alcohol. For example, in the purification of 1-butanol and higher-boiling alcohols, trimethyl borate, triethyl borate, tripropyl borate, and triisopropyl borate may be used, as well as the secondary butyl, isobutyl, and tertiary butyl borates. Triethyl borate is especially convenient. This ester, when heated with a higher-boiling alcohol, undergoes rapid radical-exchange with the higher-boiling alcohol; and if the resulting ethanol is withdrawn from the reaction mixture, the reaction is driven rapidly to completion, giving the desired borate of the higher-boiling alcohol according to the following equation, where R represents a $C_3$ or higher hydrocarbon radical:

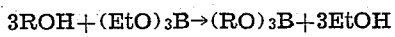

$$3ROH + (EtO)_3B \rightarrow (RO)_3B + 3EtOH$$

It will be apparent that we are not restricted in our choice of process esters to any one class of borate esters, but may use substantially any borate ester. For economic reasons, however, the ester should not tend to undergo degradation reactions or other side reactions under the radical-exchange conditions employed in our process.

When the esterification step of our invention is carried out with a process ester derived from a process alcohol which boils above the charge alcohol, the reaction cannot be driven to completion by withdrawing the process alcohol, as liberated, by conventional fractional distillation. Instead the esterification is conveniently carried out by passing the impure charging stock in vaporous form upward through a treating zone under radical-exchange conditions countercurrent to a stream of process ester. The liberated process alcohol and the impurities in the charging stock emerge overhead as a vapor stream, while the charge-alcohol ester, together with any unchanged process ester, flows from the bottom of the treating zone.

After the esterification step of our invention, we may effect the regeneration of the charge alcohol from its purified borate ester by conventional means, such as simple hydrolysis with water. Preferably, however, we effect a second radical exchange between the purified charge-alcohol ester and a process alcohol of the class defined above, preferably the alcohol derivable from the process ester used in the esterification step. Where the radical exchange is effected with a process alcohol boiling above the charge alcohol, the reaction may be driven to completion by fractionally distilling the liberated charge alcohol from the reaction mixture. Where, however, the process alcohol boils below the charge alcohol, then the regeneration step may be carried out by passing the process alcohol in vapor form upward through a treating zone countercurrent to a descending stream of the purified charge-alcohol ester. The charge alcohol is regenerated thereby in purified form, and emerges overhead, while the process ester is regenerated and is withdrawn from the bottom of the treating zone, from which it can be recycled.

In the esterification step of our invention, the molar ratio of process ester to alcohols in the impure charging stock should be at least about 0.33:1 and preferably somewhat higher, for example from 0.35:1 to 0.4:1, in order to permit substantially complete conversion of the charge alcohols into borate esters.

In effecting radical exchange between the impure charging stock and the process ester in the first step of our invention, conventional process conditions may be used, well known in the art. The reaction may be effected, for example, at ordinary or at elevated pressures and at a temperature sufficiently high to maintain a vapor stream at the pressure employed, and to distill out the desired fraction. For example, a temperature above about 60° C. in the reaction zone is ordinarily sufficient to produce a satisfactory rate of radical interchange, but higher temperatures, e. g. 80° C. and above, are generally required to bring the reaction mixture to reflux, even when operating with trimethyl borate as the process ester. A catalyst for the reaction is not required, but the reaction may be accelerated by incorporating in the reaction mixture a catalytic amount, for example, around 1% by weight, of a strong acid such as sulfuric acid, toluenesulfonic acid, propanesulfonic acid, phosphoric acid, or the like. The charging stock should preferably be substantially free from water, since any water present therein tends to hydrolize the process ester and to retard the formation of the desired charge-alcohol ester.

The regeneration of the charge alcohol and the process ester may be carried out under the general conditions used in the esterification step. For complete regeneration of the process ester, the molar ratio of the process alcohol to the purified charge-alcohol ester should be at least 3:1, and preferably somewhat higher, for example 4:1 or more.

It will be apparent that the effectiveness of the boration process for purifying alcohols depends on the conversion of the alcohols into ester-type derivatives boiling above the impurities present with the alcohol, so that the impurities may be fractionally distilled away from the alcohol derivatives. As a preliminary to the boration process, it is therefore advantageous to subject the impure alcohol charging stock to such subsidiary operation or operations as will remove any impurities boiling in the range of the borates of the alcohols. This may suitably be done by subjecting the impure alcohol to a preliminary fractional distillation and separating the alcohol as a distillate fraction of relatively narrow boiling range, substantially free from higher-boiling impurities that might contaminate the esters subsequently to be formed. Mixtures of alcohols, such as the oil phase obtained in the oxidation of hydrocarbons or in the hydrogenation of carbon monoxide in the presence of an alkali-promoted iron catalyst, may advantageously be separated by fractional distillation into a series of fractions of narrow boiling range, each of which may then be subjected to the boration process.

It will be further apparent that the operativeness of the radical-exchange process for the boration and purification of an impure alcohol depends on the use, for the initial radical-exchange step, of the borate ester of an alcohol wherein the alcohol boils sufficiently far from the impure alcohol to permit the separation thereof, preferably by fractional distillation. For this purpose, it is ordinarily sufficient if the process alcohol boils around 5 to 10° C. above or below the charge alcohol.

In effecting the initial radical-exchange step of our process, we prefer to utilize a borate ester of the specific process alcohol to be used subsequently in the regeneration of the charge alcohol. This facilitates the design and operation of the process, since it simplifies the matter of recovery and recycle of the various process materials. In view of the foregoing description, however, it will be apparent that out process is not limited to such an embodiment, but is applicable broadly as herein set forth.

In an advantageous embodiment of our invention, applied to the treatment of the organic stream obtained in the hydrogenation of carbon monoxide, the borate esters obtained from one boiling-range fraction thereof may be used to effect the boration of another fraction, while simultaneously regenerating the purified alcohols from the first fraction. This procedure may be repeated at will on further fractions, so that the necessity for providing a special process ester is obviated.

Our process is suitable for the purification of alcohols in general, and is especially well adapted to the purification of alcohols having from one to twenty carbon atoms in the molecule. While we have obtained excellent results in the purification of aliphatic primary monohydric alcohols, our process is not limited thereto, but is also applicable to the treatment of aliphatic, cycloaliphatic, and aromatic alcohols, primary, secondary, and tertiary, monohydric and polyhydric, saturated and unsaturated, and of alcohols wherein the hydrocarbon radical is a combination of aliphatic and/or cycloaliphatic and/or aromatic groups. Our process is suitable, for example, for the purification of isopropyl alcohol, 1-butanol, tertiary amyl alcohol, 2-ethyl-1-hexanol, capryl alcohol, 1-decanol, cetyl alcohol, stearyl alcohol, crotyl alcohol, ethylene glycol, 1, 3-butanediol, glycerol, cyclohexanol, 3-methylcyclohexanol, phenol, beta-naphthol, benzyl alcohol, resorcinol, and the like.

The first of the attached flowsheets, Figure 1, illustrates an embodiment of our invention employing two extractive distillation operations to effect the desired interchanges of organic radicals, and employing a process ester derived from a process alcohol boiling below the charge alcohol.

A dry, impure alcohol stream, suitably a fraction of restricted boiling range obtained from the oil stream produced by the hydrogenation of carbon monoxide in the presence of a fluidized, alkali-promoted iron catalyst, is introduced through line 101, heater 102, and line 103 into the top of fractionating column ("extractive still") 104, equipped with reboiler 105. Therein, it flows downward countercurrent to a vaporous stream of borate process-ester, derivable from an alcohol boiling below the charge alcohol, and introduced into a lower intermediate section of the column through line 106. Makeup process ester is supplied as needed through line 107, heater 108, and line 109, preferably to a somewhat lower section of column 104, and the total quantity of process ester entering column 104 is somewhat in excess of the stoichiometric quantity required to convert all of the alcohols in the impure alcohol stream into borates. The bottom of column 104 is operated at a temperature sufficiently high, suitably above about 130° C., to boil substantially all process alcohol and process ester therefrom, and the column is operated under a sufficient pressure to permit such temperature therein. Under these conditions, substantially complete radical interchange between the impure alcohols and the process ester takes place, with the result that a vaporous process-alcohol stream containing more or less process ester, depending on the excess ester entering the column, emerges overhead through line 110, and a treated charging stock wherein the charge alcohols are now present as the borate esters emerges from the bottom of the column through line 111.

The treated charging stock is transferred by pump 112 through line 113, heater 114, and line 115 into an intermediate section of fractionating column 116, equipped with reboiler 117. Therein, the charge-alcohol borates are stripped substantially free from the impurities originally present in the charging stock, and are withdrawn in purified form from the bottom of the column through line 118. The lower-boiling impurities, including hydrocarbons, aldehydes, ketones, ethers, and the like, are taken off overhead through condenser 119 into reflux drum 120, from which a portion is refluxed to the top of the column through valved line 121, and the remainder is withdrawn through valved line 122.

The charge-alcohol borates in line 118 are transferred by pump 123 through line 124, heater 125, and line 126 into the top of fractionating column ("extractive still") 127, equipped with reboiler 128. Therein, it flows downward countercurrent to a vaporous stream of process alcohol, introduced into a lower intermediate section of the column through line 129, heater 130, and line 131. Makeup process alcohol is supplied as needed through line 132, heater 133, and line 134, preferably to a somewhat lower portion of column 127. Radical interchange takes place within column 127 under substantially the same conditions employed in column 104, with the result that substantially all of the charge-alcohol borates entering the top of the column are decomposed, and the charge alcohols are regenerated and withdrawn from the bottom of the column through line 135, cooler 136, and line 137 to storage or to further processing to isolate the individual constituents thereof. A mixture of process ester and a quantity of process alcohol, depending on the quantity of excess process alcohol entering the bottom of the column, emerges overhead from column 127 through line 138.

The overhead streams from columns 104 and 127 are further processed in fractionating column 139, equipped with reboiler 140. The mixture of process alcohol and process ester in line 110, ordinarily predominantly process alcohol, is led through heater 141 and line 142 into an upper intermediate section of column 139; and the mixture of process ester and process alcohol in line 138, ordinarily predominantly process ester is led through heater 143 and line 144 into a lower intermediate section of column 139. Within the column, the alcohol and the ester are separated. The alcohol is distilled overhead through condenser 145 into reflux drum 146, from which a portion is refluxed to the column through valved line 147, and the remainder is recycled to column 127 through valved line 129, heater 130, and line 131. The process ester flows from the bottom of column 139 through line 148, and is recycled by pump 149 through line 150, heater 151, and line 106 to column 104.

Figure 2:
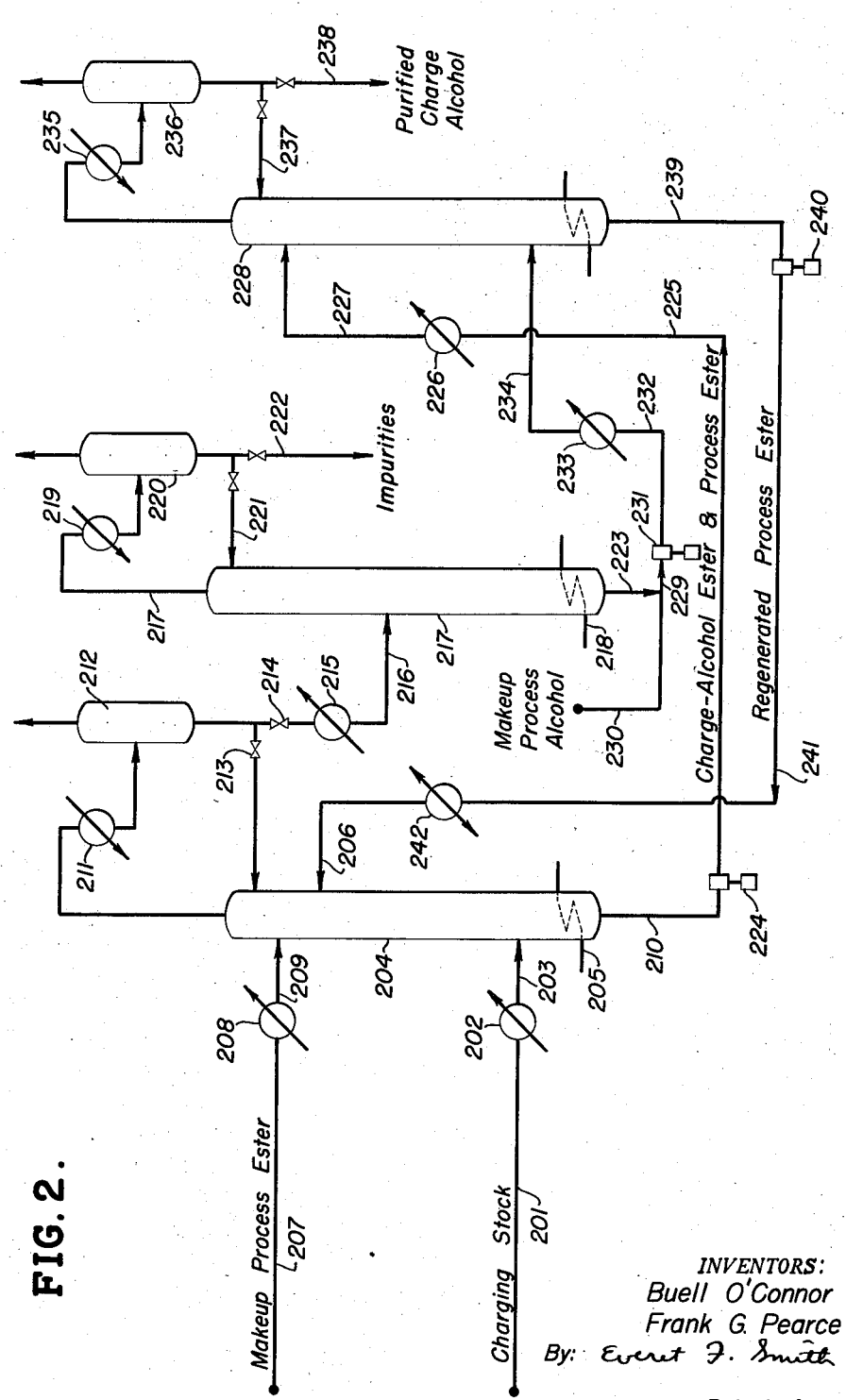

Figure 2 illustrates an advantageous embodiment of our invention employing a process ester derived from a process alcohol boiling above the charge alcohol. In this embodiment, the initial radical exchange between the charge alcohol and the process ester, and the separation of impurities from the resulting charge-alcohol ester, are carried out simultaneously in a single extractive still.

An impure alcohol charging stock is introduced through line 201, vaporizer 202, and line 203 into a lower section of fractionating column ("extractive still") 204, equipped with reboiler 205. The resulting stream of vaporous charging stock flows upward through the column and is countercurrently contacted with a hot, liquid stream of a process ester—a borate ester of an alcohol (the "process alcohol") boiling higher than the charge alcohol. The process ester is introduced into an upper section of fractionating column 204 through line 206, and makeup process ester is supplied as required to the same or a neighboring section of the column through line 207, heater 208, and line 209. Within column 204 two effects occur. Radical exchange takes place between the charge alcohol and the process ester, liberating the process alcohol; and the impurities in the charging stock, being lower-boiling than the esters present within the column, are distilled overhead in combination with the liberated process alcohol. From the bottom of column 204 through line 210 emerges a stream of charge-alcohol ester, together with any unchanged process ester. The vaporous stream of impurities and process alcohol emerging overhead from column 204 flows into condenser 211, and the resulting condensate flows into reflux drum 212, from which a portion is refluxed through valved line 213 to the top of column 204, while the remainder is withdrawn through valved line 214.

The mixture of impurities and process alcohol in valved line 214 is led through heater 215 and line 216 into an intermediate section of fractionating column 217, equipped with reboiler 218. Therein, the impurities are fractionally distilled overhead through condenser 219 into reflux drum 220, from which a portion are refluxed to column 217 through valved line 221, and the remainder are withdrawn through valved line 222. From the bottom of fractionating column 217 a stream of purified process alcohol emerges through line 223.

The mixture of charge-alcohol ester and process ester in line 210 is transferred by pump 224 through line 225, heater 226, and line 227 into an upper section of fractionating column ("extractive still") 228. The stream of process alcohol in line 223 is combined in line 229 with makeup process alcohol, supplied through line 230, and the mixture is transferred by pump 231 through line 232, vaporizer 233, and line 234 into a lower section of fractionating column 228. Within column 228, the vapors of the process alcohol pass upward countercurrent to the descending stream of charge-alcohol ester. Radical interchange between the two streams takes place, regenerating the process ester and liberating the charge alcohol in purified form. The purified charge alcohol emerges overhead from column 228 through condenser 235 into reflux drum 236, from which a portion is refluxed through valved line 237 to the top of column 228 to repress the simultaneous distillation of any esters, which would contaminate the charge alcohol, and the remainder of the overhead stream is withdrawn through valved line 238 as the desired purified product.

From the bottom of column 228 through line 239 emerges a stream of regenerated process ester, which is recycled by pump 240, line 241, heat exchanger 242, and line 206 to column 204.

In the foregoing embodiment of our invention, the process ester should additionally be chosen so that the process-alcohol constituent thereof has a boiling point which differs at least about 5 to 10° C. from the boiling point of the non-alcoholic impurities contained in the charging stock, in order to permit the separation of the process alcohol from the charging-stock impurities in fractionating column 217. The method illustrated in Figure 2 employs a process alcohol boiling above the impurities, so that the process alcohol emerges from the bottom of fractionating column 217. Where the process alcohol boils below the impurities, it will be apparent that the process alcohol and the impurities will emerge respectively from the top and the bottom of the column, without otherwise altering the manner in which the process is carried out.

The following specific example illustrates the application of our invention to the isolation of 1-octanol.

A 279-ml. portion of impure 1-octanol containing 1.76 gram-moles of the alcohol was commingled with 47 ml. of triethyl borate, and the mixture was fractionally distilled. A first distillate fraction measuring 49 ml. and consisting essentially of ethanol was withdrawn. Thereafter, a second distillate fraction was withdrawn, comprising the excess 1-octanol present in the charge. This fraction measured 133 ml. and contained 0.84 gram-mole of the alcohol.

The distillation residue, measuring 131 ml. and comprising predominantly trioctyl borate, was passed downward through a column having an inside diameter of 0.71 inch and a total length of five feet, packed with single-turn glass helices, while upward through the column, countercurrent to the descending stream of distillation residue, flowed a vaporous stream of ethanol, supplied from a reboiler at the base of the column. The temperature of the system ranged from 150° C. in the reboiler to 100° C. at the top of the column. A total volume ratio of ethanol to higher-alcohol borate of 3.5 was used. A vaporous stream comprising essentially triethyl borate and ethanol was taken off overhead and was condensed and analyzed. The condensate measured 500 ml. and contained 2.4% by volume of triethyl borate. The bottom product was fractionally distilled to separate the purified alcohols therefrom. By this means 34 ml. of substantially pure 1-octanol were recovered.

While we have illustrated our invention with certain specific embodiments thereof, it is to be understood that we are not limited thereto. Our invention is applicable broadly within the scope of the description and the claims, and any modifications or equivalents thereof that would ordinarily occur to those skilled in the art are to be considered as lying within the scope of our invention.

In accordance with the foregoing description, we claim as our invention:

1. An improvement in the boration process for purifying a crude alcohol employing radical interchange between an alcohol and a borate ester of another alcohol, which improvement comprises effecting said radical interchange by countercurrently contacting an alcohol with a borate ester of another alcohol in a distillation zone under extractive distillation conditions, and separately withdrawing from said distillation zone the alcohol and the borate ester resulting from said radical interchange.

2. An improvement in the boration process for purifying a crude alcohol employing radical interchange with a borate ester of another alcohol, said crude alcohol having a boiling point lower than said ester, which improvement comprises effecting said radical interchange by countercurrently contacting a vaporous stream of said crude alcohol with a liquid stream of said borate ester in a distillation zone under extractive distillation conditions, and separately withdrawing from said distillation zone said other alcohol and a borate ester of said crude alcohol as distillate and bottoms streams in accordance with the relative boiling points thereof.

3. An improvement in the boration process for purifying a crude alcohol employing radical interchange with a borate ester of another alcohol, said crude alcohol having a boiling point higher than said ester, which improvement comprises effecting said radical interchange by countercurrently contacting a vaporous stream of said borate ester with a liquid stream of said crude alcohol in a distillation zone under extractive distillation conditions, and separately withdrawing from said distillation zone said other alcohol and a borate ester of said crude alcohol as distillate and bottoms streams in accordance with the relative boiling points thereof.

4. An improvement in the boration process for purifying a crude alcohol employing radical interchange with another alcohol for regenerating the purified alcohol from a purified borate ester thereof, said other alcohol having a boiling point lower than said ester, which improvement comprises effecting said radical interchange by countercurrently contacting a vaporous stream of said other alcohol with a liquid stream of said purified borate ester in a distillation zone under extractive distillation conditions, and separately withdrawing from said distillation zone said purified alcohol and a borate ester of said other alcohol as distillate and bottoms streams in accordance with the relative boiling points thereof.

5. An improvement in the boration process for purifying a crude alcohol employing radical interchange with another alcohol for regenerating the purified alcohol from a purified borate ester thereof, said other alcohol having a boiling point higher than said ester, which improvement comprises effecting said radical interchange by countercurrently contacting a vaporous stream of said purified borate ester with a liquid stream of said other alcohol in a distillation zone under extractive distillation conditions, and separately withdrawing from said distillation zone said purified alcohol and a borate ester of said other alcohol as distillate and bottoms streams in accordance with the relative boiling points thereof.

BUELL O'CONNOR.
FRANK G. PEARCE.

REFERENCES CITED

The following references are of record in the file of this patent:

UNITED STATES PATENTS

| Number | Name | Date |
| --- | --- | --- |
| 1,886,885 | Kaufmann | Nov. 8, 1932 |
| 2,068,415 | Klipstein | Jan. 19, 1937 |
| 2,088,935 | Vaughn | Aug. 3, 1937 |

OTHER REFERENCES

Schiff: Annalen, Supplement, vol. 5, 187 (1867).